United States Patent [19]

Ditcher et al.

[11] 4,387,900
[45] Jun. 14, 1983

[54] METHOD AND APPARATUS FOR PROVIDING WATERTIGHT SEAL FOR MANHOLE PIPE CONNECTION

[75] Inventors: Jack Ditcher, Langhorne; James A. Westhoff, Huntington Valley, both of Pa.

[73] Assignee: A-Lok Products, Inc., Tullytown, Pa.

[21] Appl. No.: 375,181

[22] Filed: May 5, 1982

[51] Int. Cl.$^3$ .................................................. F16J 15/52
[52] U.S. Cl. .................................. 277/101; 277/207 A; 277/212 FB; 277/1; 285/110; 285/230
[58] Field of Search ............ 277/34, 34.3, 34.6, 277/101, 152, 153, 165, 166, 186, 205, 207 R, 207 A, 1, DIG. 2, 212 FB, 226; 285/110, 230, 231, 232, 345

[56] References Cited

U.S. PATENT DOCUMENTS

| | | | |
|---|---|---|---|
| 4,017,089 | 4/1977 | Kurata et al. | 277/212 FB |
| 4,121,845 | 10/1978 | Reynolds et al. | 277/212 FB |
| 4,159,829 | 7/1979 | Ditcher | 277/207 A X |
| 4,200,299 | 4/1980 | Carlesimo | 277/DIG. 2 X |

FOREIGN PATENT DOCUMENTS

| | | | |
|---|---|---|---|
| 654454 | 2/1965 | Belgium | 277/207 A |
| 1182482 | 11/1964 | Fed. Rep. of Germany | 285/110 |
| 838101 | 11/1938 | France | 277/207 A |
| 1125110 | 7/1956 | France | 277/207 A |
| 457629 | 12/1936 | United Kingdom | 277/207 A |
| 1239228 | 7/1971 | United Kingdom | 277/212 FB |

*Primary Examiner*—Robert S. Ward, Jr.
*Attorney, Agent, or Firm*—Weinstein & Sutton

[57] ABSTRACT

A resilient gasket having an outer annular flange positioned within a manhole opening and maintained thereagainst under compression by means of a compression band. The gasket is provided with a central opening defined by an enlarged beaded periphery having an elasticity adapted to tightly encircle the outer periphery of the pipe. A folded intermediate section is arranged between and integrally joined to the outer flange and the beaded inner periphery, the intermediate section is comprised of first and second diagonally aligned annular portions integrally joined along a fold to define a V-shape which imparts a yieldability enabling the gasket to maintain a watertight seal between the manhole opening and the pipe, even in the presence of a significant misalignment therebetween. A strap is positioned about the intermediate section of the gasket adjacent the inner beaded periphery to enhance the watertight seal between the gasket and the pipe. The compression band may be provided with pairs of substantially V-shaped slots which enable the band to assume a curvature in a direction transverse to the curved periphery in order to conform to the curvature of the manhole opening. The clamping band is formed of a material which is impervious to the surrounding environment and has a gap and a segment hingedly connected to the main body thereof for placement in said gap and against the interior surface of the gasket to lock the compression band in position and maintain the gasket flange under compression. An expansion assembly includes an expansion ring which cooperates with a hydraulic jack and is positioned against the compression band to expand the compression band into position against the gasket flange and to apply a force uniformly around the compression band to insure proper positioning and locking of the clamping band.

25 Claims, 11 Drawing Figures

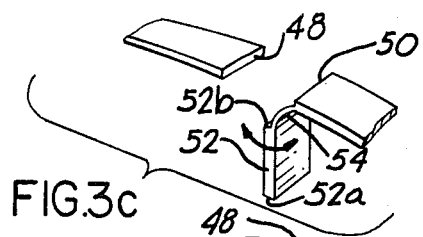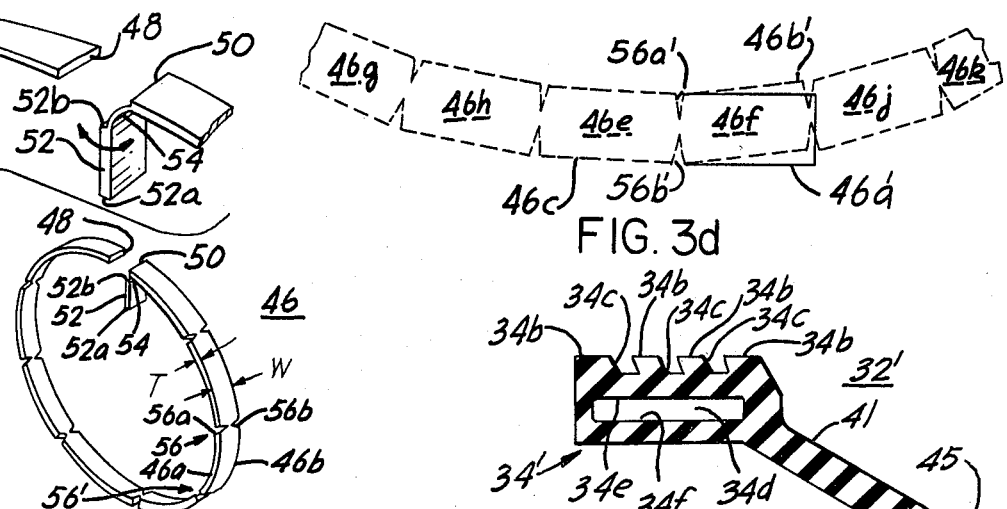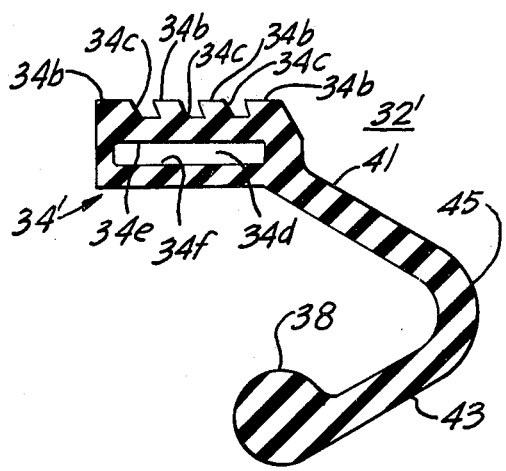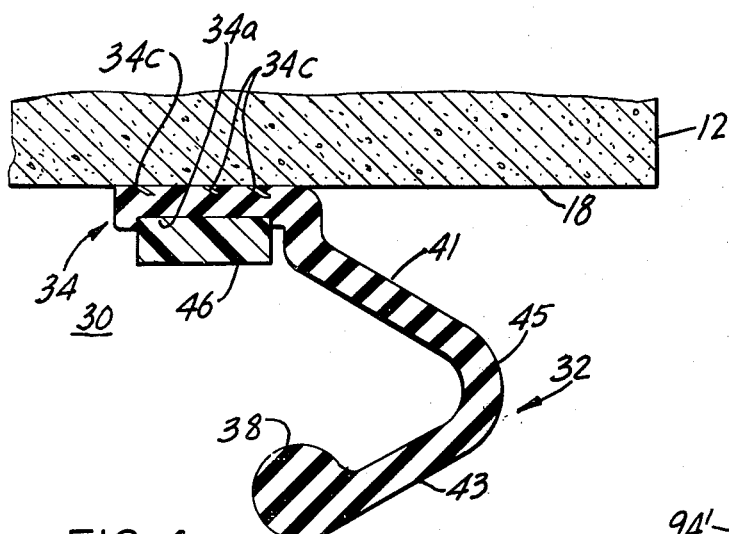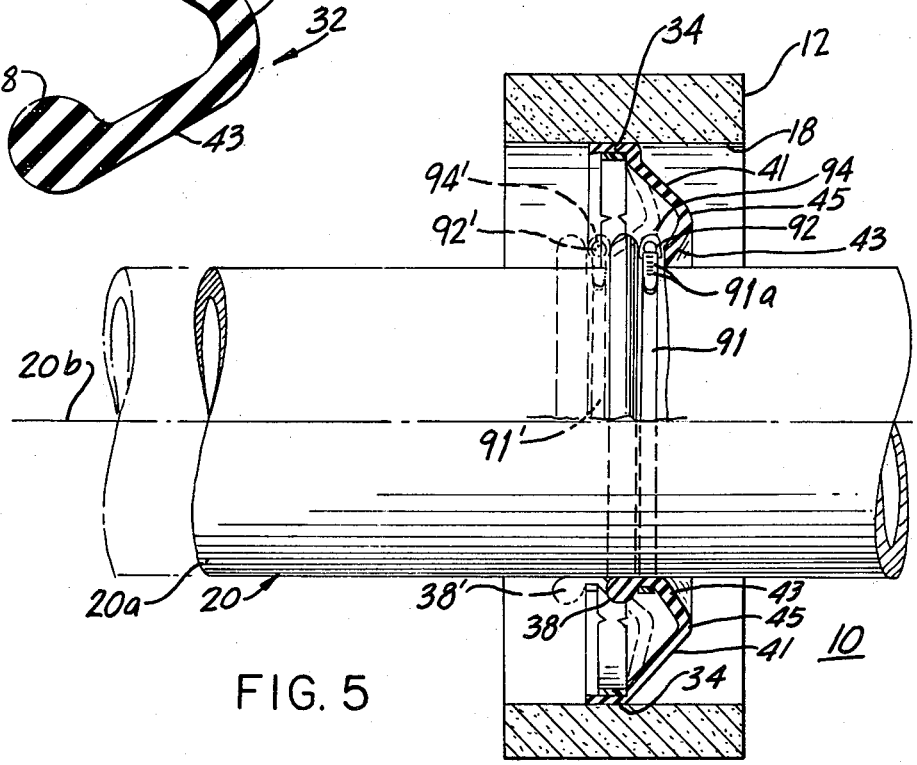

4,387,900

METHOD AND APPARATUS FOR PROVIDING WATERTIGHT SEAL FOR MANHOLE PIPE CONNECTION

FIELD OF THE INVENTION

The present invention relates to method and apparatus for providing a watertight seal between a pipe and a manhole opening, and more particularly to a novel gasket assembly comprising a gasket and a compression band for facilitating the assembly thereof and for the method of their assembly.

BACKGROUND OF THE INVENTION

Pipe runs for sewage systems and the like are terminated at predetermined intervals within manhole assemblies to facilitate maintenance, inspection and repair. A coupling seal is provided between the manhole opening and the pipe to provide a watertight seal therebetween and preferably to allow for some movement of the pipe relative to the manhole assembly, typically caused by external forces.

One technique for accomplishing this type of seal is described in U.S. Pat. Nos. 3,796,406; 3,813,107 and 3,832,438 and assigned to the assignee of the present invention. This technique employs a gasket which has its outer periphery embedded in the concrete material during the time that the manhole member is cast. Although this type of gasket provides a good watertight seal between the manhole opening and the pipe, the amount of movement which the pipe can experience relative to the manhole opening is quite limited, due to the nature of the gasket.

The misalignment of a pipe relative to the manhole opening may be significant in certain applications and further since the pipe may undergo a significant amount of movement relative to the manhole as a result of subterranean influences, a gasket has been developed to accomodate significant changes in the displacement between the pipe and the manhole opening which gasket and method of assembly is described in U.S. Pat. No. 4,103,901, issued Aug. 1, 1978 and assigned to the assignee of the present invention. The gasket disclosed in the last mentioned patent is comprised of an outer peripheral flange which is embedded in the concrete material from which the manhole assembly is cast. The gasket is provided with a central opening defined by a gasket inner annular periphery shaped to have an appearance substantially similar to an O-ring, said gasket further including an integral, intermediate section having first and second diagonally aligned portions integrally joined at opposite ends to said outer flange and said inner periphery and integrally joined to one another along an imaginary circular line defining a V-shape with the fold being at the point joining the aforesaid portions. The gasket is arranged within the manhole opening such that the outer flange is embedded in the concrete surrounding said opening. The O-ring shaped inner periphery is sufficiently yieldable to embrace the outer surface of a pipe section extending therethrough. The intermediate section of the gasket is V-shaped to enable the gasket to resiliently support a pipe, ideally so that its longitudinal axis coincides with the axis of the manhole opening and yet which is sufficiently and readily yieldable to resiliently support the pipe relative to the manhole member and retain the watertight seal therebetween in spite of the fact that the pipe undergoes a significant displacement from the aforementioned concentric position with the manhole opening. This displacement may be of the order of several inches.

Although the above described gasket has the capability of accommodating pipes having an outer diameter which deviates from a nominal value over a significant range which is of the order of several inches and is further capable of maintaining a watertight seal between the pipe and the manhole opening in spite of an alignment displacement therebetween of the order of several inches, the above described gasket is designed to be embedded into the manhole base at the time that the base member is cast.

BRIEF DESCRIPTION OF THE INVENTION

The present invention is characterized by comprising a combination gasket and clamping assembly capable of being mounted within a main hole opening either at the plant or in situ.

Many manhole bases are cast independently of the sealing gasket. For example, some manhole bases are cast with no manhole openings or are cast with a smooth manhole opening, defined only by the cast material and having no sealing gasket.

The present invention is characterized by providing all of the capabilities of the above mentioned sealing gasket and which is further capable of being installed in situ. The gasket assembly of the present invention comprises a gasket member adapted to be fully contained within the manhole opening and comprises an annular outer flange substantially conforming to the manhole opening and initially loosely positioned therein. The gasket is provided with a central opening defined by an inner peripheral edge having an enlarged beaded cross-section, substantially conforming to an O-ring. An integral intermediate V-shaped section is arranged between the outer flange and the inner beaded periphery and includes two diagonally aligned annular portions integrally joined to one another along an imaginary annular fold line, said intermediate V-shaped section being yieldable and enhancing the ability of the gasket inner periphery, whose central axis normally coincides with the central axis of the outer flange, to be displaced therefrom by a significant displacement distance in order to position and support a pipe within the manhole opening to retain the integrity of the watertight seal therebetween in spite of the fact that the longitudinal axis of the pipe is displaced from the central axis of the manhole opening due to misalignment therebetween which may occur during initial installation or as a result of external influences acting upon the pipe.

The flange of the gasket is secured within the manhole opening by means of a circular compression band formed of a material which is impervious to corrosive type influences and is installed by means of an expansion assembly comprised of an annular shaped band having a discontinuity about its periphery to enable the band to be easily expanded. A hydraulically operated jack is pivotally coupled to the expandable band. The clamping band is placed about the outer periphery of the expandable band, and these members are placed within the interior periphery of the gasket outer flange. The hydraulic jack is pressurized to expand the expandable band which in turn exerts an expansion force which is distributed substantially uniformly about the entire interior periphery of the clamping band, causing the clamping band to be expanded outwardly against the gasket outer flange whereupon the outer periphery of the flange is intimately pressed against the manhole opening and the flange itself undergoes compression by the clamping band.

Expansion is complete when the hinged segment fits into the gap between the ends of the clamping band. This gap length is predetermined for each standard hole size and assures the proper compression for watertightness. Other prior art techniques employ a pressure gauge for determining when compression is adequate for watertightness. The compression ring of the present invention is molded to exact size and utilizes the installation method described hereinabove.

The clamping band is also provided with a discontinuity to enable the clamping band to be expanded, and is further provided with a short, insertable segment defining one end of the discontinuity and which is hingedly connected to the major portion of the clamping band, preferably by a thin web of the clamping band material. The hinged connection is created by forming a cut or recess through the clamping band. The compression ring is preferably molded to exact size and includes a thin flexible section integrally joining the band and the segment to serve as a hinge a spaced distance inward from one end of the discontinuity. The recess is of a depth sufficient to provide a thin web of material sufficient to create a hinged connection between the segment and the major body of the clamping band enabling the segment to be swung away from the opposite end defining said discontinuity in order to facilitate and simplify the loose positioning of the clamping band within the interior of the gasket outer flange.

The hydraulic jack is pressurized to expand the expandable band. When the gasket flange has been sufficiently compressed against the manhole opening, the insertable segment is swung up into the gap region formed by the discontinuity. Thereafter, the hydraulic pressure is relieved causing the compressed gasket flange to exert a counteracting force against the clamping band which, together with the insertable segment, serves to retain the clamping band in the locked position. The force exerted by the clamping band upon the compressed gasket flange creates and maintains a watertight seal between the outer flange of the gasket and the manhole opening.

The end of the pipe to be arranged within the manhole opening is pressed into the central opening of the gasket. The gasket opening O-ring periphery has an unexpanded inner diameter which is less than the outer diameter of the pipe being pressed into the gasket. The O-ring periphery is capable of expanding to accept the pipe and yet is of sufficient cross-section to exert a substantial holding force upon the pipe. In order to further enhance the watertight seal between the pipe and the gasket, an adjustable strap is positioned about the intermediate section of the gasket adjacent said O-ring periphery and is tightened to compress the portion of the gasket immediately adjacent the O-ring periphery firmly about the outer surface of the pipe to assure a watertight seal therebetween.

The gasket serves as a barrier separating the clamping band and adjustable strap from the exterior of the manhole to shield the clamping band and the strap from external influences, to protect and preserve their useful operating life and to facilitate and simplify maintenance, inspection, repair and replacement thereof.

OBJECTS OF THE INVENTION AND BRIEF DESCRIPTION OF THE FIGURES

It is therefore one object of the present invention to provide a gasket adapted for in situ installation within a manhole opening to provide a watertight seal between the manhole and the pipe inserted therein wherein the gasket is designed to retain the requisite watertight seal in spite of a significant displacement of the pipe from a desired concentric position within the manhole opening.

Still another object of the present invention is to provide a novel clamping assembly for use in clamping a gasket of the character described within the manhole opening which includes expandable clamping means and a method and apparatus for expanding and locking the clamping means against the gasket to obtain the desired watertight seal.

Still another object of the present invention is to provide a novel gasket and clamping band of the character described and further including novel expansion means for simple, straightforward and yet reliable installation of the clamping band, i.e. through the utilization of a hydraulically operated expansion ring.

Still another object of the present invention is to provide a novel gasket assembly comprising gasket and cooperating clamping band for clamping the gasket within the manhole opening, said band incorporating an insertable segment hingedly connected to the main body thereof and swingable into a position to fill the gap in the circular band for clamping and locking the gasket in place and thereby maintaining the gasket flange in a compressed state within the manhole opening.

Still another object of the present invention is to provide a novel gasket assembly comprising a gasket and cooperating clamping band which is provided with cooperating pairs of substantially V-shaped slits which permit the clamping band to assume a curvature in a direction transverse to the curvature of the band in order to conform with the curvature within the manhole opening.

The above, as well as other, objects of the present invention will become apparent when reading the accompanying description and drawing, in which:

FIG. 3b shows a perspective view of the compression band of FIGS. 3 and 3a.

FIGS. 3c and 3d show detailed views of portions of the clamping band of FIGS. 3 through 3b.

FIG. 4 is a sectional view showing the gasket and compression band of FIGS. 2 and 3b installed within the manhole opening.

FIG. 4a is a sectional view showing an alternative embodiment of the gasket of the present invention.

FIG. 5 is a sectional view of the gasket and clamping band of the present invention being fully installed and supporting a pipe within the manhole opening.

DETAILED DESCRIPTION OF THE INVENTION AND THE PREFERRED EMBODIMENTS THEREOF

Figure 1:
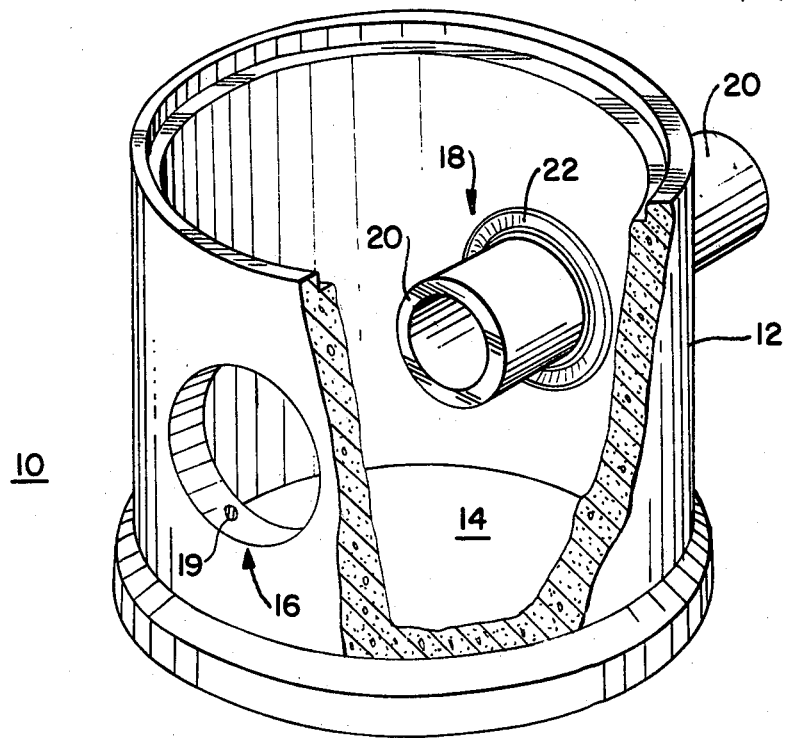
FIG. 1 is a perspective view of a manhole base having portions thereof partially broken away.

FIG. 1 shows a manhole base 10 comprised of a cylindrical-shaped sidewall 12 integrally joined at its lower end to a floor 14. The manhole base of FIG. 1 is further provided with a pair of openings 16, 18, each of which may be formed during casting of base 10. The manhole openings 16, 18 may alternatively be formed by conventional coring techniques. Each opening receives a pipe section such as for example a pipe section 20. The manhole base 10 may be entered for maintenance, inspection and repair purposes.

Gasket assembly 22 is arranged between manhole opening 18 and pipe 20 to provide a watertight seal therebetween.

Figure 2A:
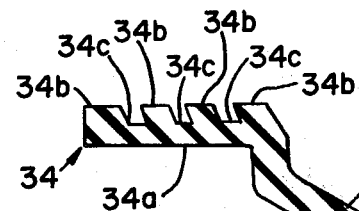
FIG. 2a is an enlarged sectional view of the gasket of FIG. 2.
Figure 2:
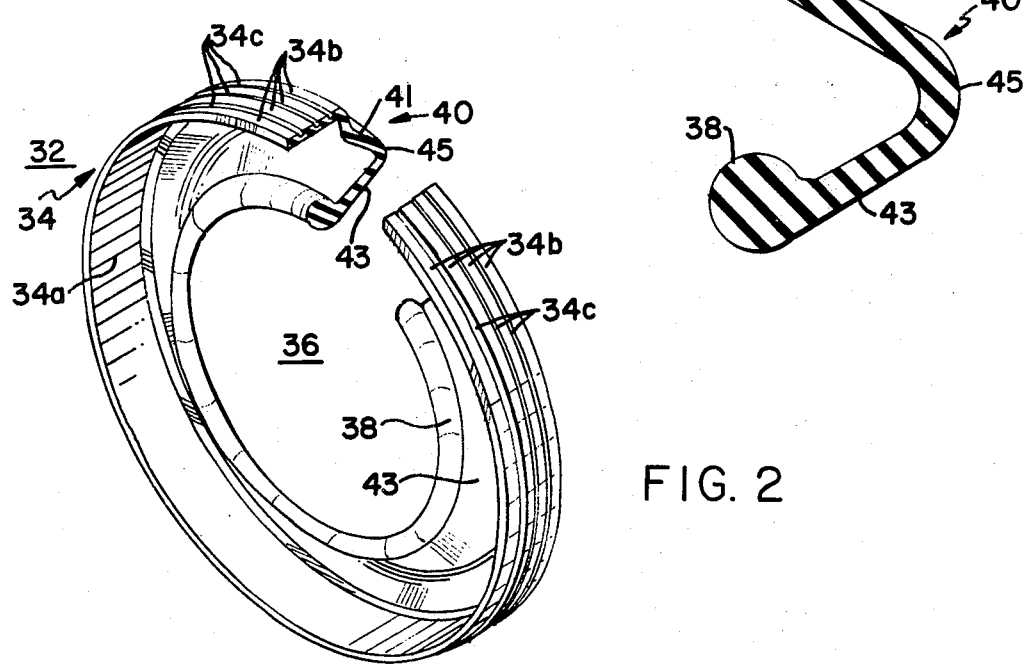
FIG. 2 is a perspective view of a gasket designed in accordance with the principles of the present invention and which is partially sectionalized.

Due to the difficulty in assuring that the pipe section and manhole opening are concentric, it is desirable to provide a gasket assembly 22 which compensates for deviations from concentricity of pipe 20 and opening 18, while, at the same time, assuring that an adequate watertight seal is maintained. To accomplish this, the present invention utilizes a gasket assembly 30, shown for example in FIGS. 4 and 2. The gasket assembly 30 is comprised of a gasket 32 and a clamping ring 46 arranged to be mounted within a manhole opening 18 in a manner to be more fully described. FIGS. 2 and 2a shown the gasket 32 which is comprised of an outer annular flange 34. The central opening 36 is defined by an enlarged beaded periphery 38 generally resembling an O-ring.

The intermediate section 40 of gasket 32 comprises a pair of diagonally aligned annular shaped webs 41, 43 integrally joined to one another along an annular imaginary fold line 45 and defining a V-shaped intermediate section. The outer end of web 41 is integrally joined to flange 34, while the inner end of web 43 is integrally joined to the O-ring portion 38.

Flange 34 has an inner band supporting surface 34a and an outer periphery comprised of a plurality of diagonally aligned projections 34b spaced from one another to define recesses 34c which enable the projections 34b to be pressed toward the left and downwardly toward the main body of the flange 34.

FIGS. 2a, 3b and 4 show the compression band 46 forming part of the gasket assembly 30. Noting especially FIG. 3b, the compression band 46 comprises a substantially circular shaped band formed of a suitable plastic material such a polyvinylchloride (PVC) molded to form band 46. The band, in one preferred embodiment, has a thickness T in the range of from 0.24 to 0.30 inches and a width W in the range of from 0.70 to 0.80 inches, with the preferred thickness being 0.275 inches and the preferred width being 0.750 inches. The band is preferably molded as a solid, continuous annular member which is cut at 48 to provide a discontinuity. A second cut 50 is formed in band 46. However, cut 50 does not extend through the thickness T of band 46, but extends to a depth which is slightly less than the thickness T, thereby forming a segment 52 which is swingably joined to the main body of band 46 by a thin web 54 which serves to hingedly couple segment 52 to the main body of the clamping band 46.

Figure 3:
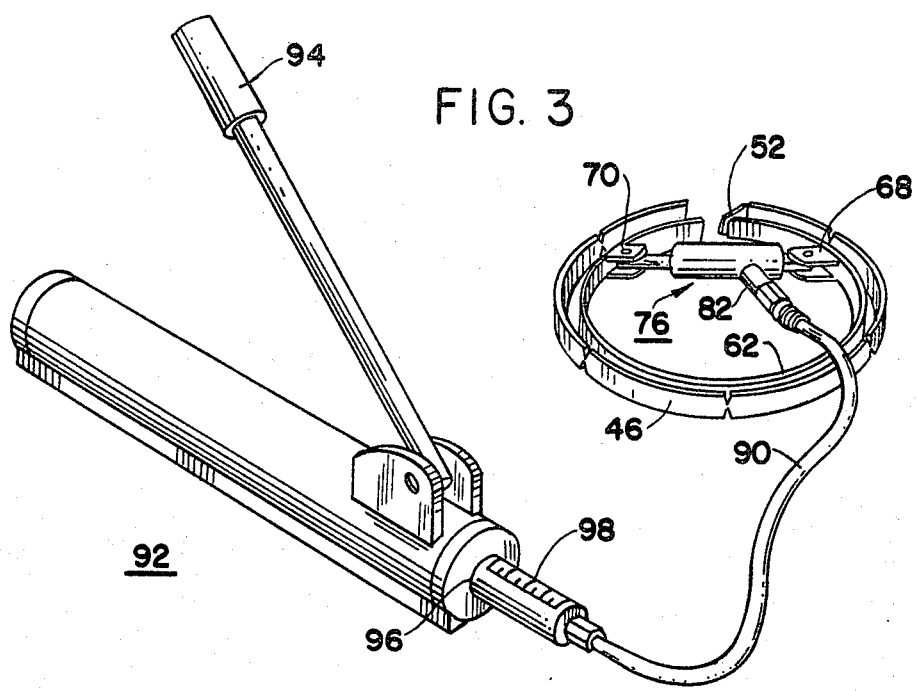
FIG. 3 is a perspective view showing the compression band utilized for locking the gasket of FIG. 2 within a manhole opening and further showing the apparatus for expanding and locking the compression band in position.
Figure 3A:
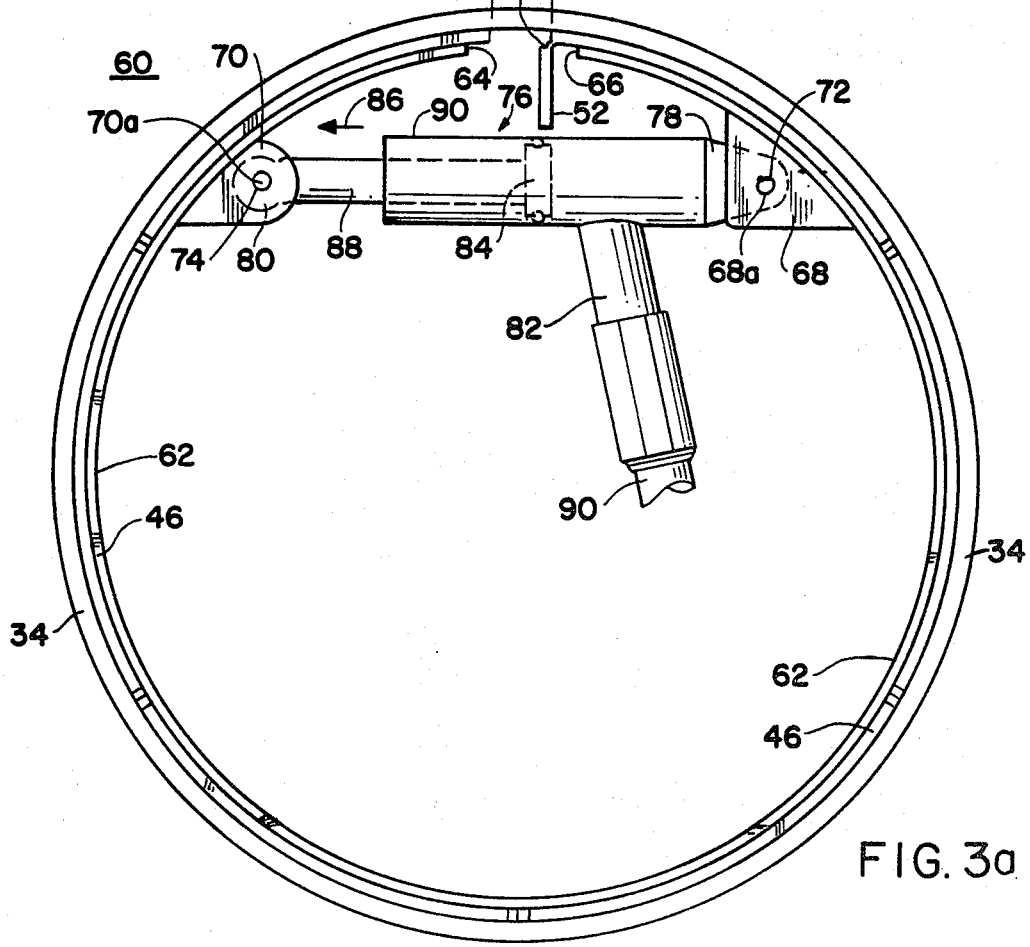
FIG. 3a is a side view showing the manner in which the expansion apparatus, compression ring and gasket are arranged for installation within the manhole opening.

The gasket assembly 30, comprised of gasket 32 and clamping band 46, is assembled into position within a manhole opening 18 and is watertightly sealed therein by means of the expansion apparatus 60, shown best in FIGS. 3 and 3a. The expansion apparatus 60 is comprised of a metallic expansion band 62, formed of a suitable spring steel and having a discontinuity or gap 62 provided at its upper end whereby a discontinuity or gap 62 provided at its upper end whereby the ends 64, 66 are spaced apart by a small gap distance G.

A first and a second pair of projections 68, 70 are secured to the inner periphery of band 62, for example by welding. Projection pairs 68, 70 have openings 68a, 70a for receiving pins 72, 74 which further extend through openings in the ends 78, 80 of a hydraulic jack 76 provided with an inlet opening 82 for receiving air under pressure to driv piston 84 in a direction shown by arrow 86 causing piston rod 88 to be driven outwardly from housing 90 to move ends 78, 80 apart and thereby expand the circumference of expansion ring 62.

As shown in FIG. 3, opening 82 in hydraulic jack 76 is coupled through a conduit in the form of a resilient hose 90 which delivers fluid pressure to hydraulic jack 76 from hydraulic power unit 92, having an operating handle 94.

A gauge 98 is coupled between the outlet opening 96 of hydraulic power unit 92 and flexible hose 90. The manner of installation of the gasket assembly 30 is as follows:

The gasket 32 is positioned within a manhole opening, such as for example manhole opening 18, in the sidewall 12 of a manhole base, shown for example in FIG. 5. The outer periphery of flange 34 loosely rests against the surface of manhole opening 18. The clamping band 46 is positioned to encircle the expansion band 62, as shown in FIG. 3a, so that the segment 52 of ring 46 extends downwardly into the gap between the free ends 64, 66 of bands 62. THe expansion assembly 60, together with clamping band 46, are loosely positioned within the annular space immediately adjacent the inner periphery 34a of flange 34.

The operating handle 94 of hydraulic power unit 92 is operated to apply hydraulic pressure to hydraulic jack 96 causing ends 78, 80 thereof to move apart, thereby expanding the band 62. The band 62 presses against the clamping band 46, applying an expanding force substantially uniformly about substantially the entire periphery of clamping band 46, which in turn exerts a similarly uniformly distributed force against flange 34 causing band 46 to be pressed at least partially into surface 34 and wherein projections 34b are compressed and further serve to conform to and follow any irregularities in the surface of manhole opening 18, thereby assuring a good watertight seal therebetween. Expansion band 62 is expanded until the gap in clamping band 46 is of a length sufficient to swing segment 52 clockwise to move segment 52 upwardly into the aforementioned gap with its ends 52a, 52b abutting against ends 48, 50 respectively of band 46. A release lock (not shown), provided as part of the hydraulic power unit 92 and which is conventional provided in such power units, is actuated to relieve the hydraulic pressure whereupon the counteracting force of the compressed gasket flange 34 urges clamping band 46 inwardly. However, clamping band 46 does not experience any reduction in circumference due to the positioning of segment 52 within the aforementioned gap, thereby maintaining flange 34 under compression between clamping band 46 and the interior surface of manhole opening 18. This arrangement also avoids the need to expand band 46 and thereby compress flange 34 beyond the desired level of compression, eliminating the need for exerting unduly large forces upon band 46 and flange 34.

The O-ring portion 38 of gasket 32 has an appreciable mass which is yieldable upon insertion of the end 20a of pipe section 20. For example, a pipe having an inner diameter of 8 inches may have an outer diameter of as little as 8.25 inches or as great as 10.25 inches. O-ring portion 38 is sufficiently yieldable to accommodate a pipe outer diameter within the aforementioned range and yet provide a good seal therebetween. Pipe section 20 is assembled by placing end 20a, which is on the exterior side of manhole base 10, adjacent to opening 18 and substantially in alignment with O-ring portion 38. End 20a is then pressed into the central opening 36, causing O-ring portion 38 to yield by an amout sufficient to receive and accommodate the outer diameter of pipe 20. Normally, the inner diameter of O-ring portion 38 is at least slightly less than the smallest outer diameter of the pipe section 20, causing the O-ring portion 38 to experience some expansion even when receiving a pipe section 20 having an outer diameter at the low end of the above mentioned dimensional range.

The expansion of O-ring portion 38 causes the fold 45 of V-shaped section 41 to sharpen. The gasket intermediate V-shaped section 40 is designed to substantially freely yield in a controlled manner to both provide for the expansion of central opening 36, as well as to yield as a result of displacement of the longitudinal axis 20b of pipe section 20 away from the central axis of manhole opening 18. For this reason, the diameter of manhole opening 18 is sufficient to allow for a displacement of pipe longitudinal axis 20b away from the central axis of manhole opening 18 of several inches. In one example, for an application in which a manhole base 10 is adapted to receive a drainage pipe, whose outer diameter may be as small as 8.25 inches or as large as 10.25 inches, the diameter of manhole opening 18 is of the order of 12 inches allowing for a deviation from concentricity of from 1.75 to 3.75 inches.

The nominal clearance between the outer periphery of gasket flange 34 and the manhole opening 18 is of the order of 0.25 inches upon initial insertion and prior to expansion. The manhole opening 18 is normally fairly dimensionally precise. However, when coring an opening in the sidewall 12 of manhole 10, the coring device may strike a metal reinforcing member 19, typically employed for structural reinforcement of the manhole base 10, causing the coring device to vibrate during the coring operation, which results in the forming of a cored opening which can be as much as 0.5 inches greater in diameter than the desired manhole opening. In such instances, the segment 52 may be removed by severing web 54 and placing a larger segment within the gap between ends 48, 50 of clamping band 46 during the installation thereof.

The proper positioning and compression of gasket 32 and clamping ring 46 may be determined by reading the gauge 98. In one example, when the gauge reaches a reading of 4000 pounds pressure, which indicates the desired amount of compression, further expansion is terminated and the insert 52 is swung up into the aforementioned gap to retain the clamping ring 46 in the clamped position.

As was mentioned hereinabove, even though the cored opening may differ by as much as ±0.5 inches in diameter, gasket 32 is sufficiently resilient to accommodate the manhole opening within the aforementioned range and to still provide and maintain an excellent watertight seal between the pipe section 20 and the manhole base 10.

The engaging surfaces 52a, 52b of segment 52 and the ends 48, 50 of clamping band 46 need only be substantially flat and coplanar to assure proper clamping of band 46. By forming segment 52 as an integral part of the band 46 when originally formed, segment 52 is assured of having the desired radius of curvature thereby assuring that equal and opposite forces will be exerted between the clamping band 46 and the compressed gasket flange 34, substantially uniformly about the entire 360 degrees of the band 46 and gasket flange 34. FIG. 4 shows a simplified sectional view of the gasket assembly with the gasket flange 34 in the compressed state and with the clamping band 46 in the clamped position, for retaining flange 34 under compression.

In order to further enhance the watertight seal between gasket 32 and pipe section 20, a tension band 91 is positioned about a portion of the web 43 immediately adjacent O-ring portion 38. Adjusting screw 92 is rotated within housing 94 which causes the threads of adjusting screw 92 to engage slots 91a formed in tension band 91 to tighten the tension band 91 and hold the portion of web 43 adjacent to O-ring portion 38 under compression against the outer surface of pipe section 20.

In order to facilitate the insertion and tightening of tension strap 91, pipe section 20 is moved toward the left relative to FIG. 5, moving the O-ring section to the dotted line position 38', thereby positioning tension strap 91 in the dotted line position 91', simplifying the mounting of tension strap 91 and making it easier to gain access to adjusting screw 92 for suitably tightening tension strap 91. Thereafter, the pipe section 20 may be moved toward the right relative to FIG. 5, whereupon the O-ring portion moves back to the solid line position 38. In this position, it can clearly be seen that both the clamping band 46 and tension strap 91 are arranged within the interior of manhole base 10. Manhole base 10, gasket 32 and pipe 20 serve to shield clamping band 46 and tension strap 91 from being subjected to any of the environmental influences external of manhole 10, such as waste water which may percolate through the ground. The clamping band 46, as was mentioned hereinabove, is formed of a plastic material, such as PVC, which is impervious to such corrosive influences. The gasket 32 is preferably formed of polyisoprene, neoprene or EPDM, or may be formed of any other suitable material which may either be natural rubber or a rubber-like synthetic material having the properties of natural rubber. The preferred materials set forth hereinabove exhibit excellent resistance to ozone and ultraviolet radiation and have good tear resistance.

FIG. 4a shows an alternative embodiment 32' of a gasket which may be substituted for the gasket 32, shown for example in FIGS. 2 and 4, wherein like elements are designated by like numerals.

Flange 34' of gasket 32' is integrally joined with the outer end of web 41. The outer periphery of flange 34' is provided with interspersed projections 34b and recesses 34c. The central portion of flange 34' is provided with a hollow interior 34d, which may either be totally compressed so that its major walls 34e, 34f intimately engage one another or alternatively may be partially or completely filled with a liquid material, such as liquid plastic, rubber or cement, to increase the thickness of flange 34', measured in the radial direction, and thereby further enhance the watertight seal. Gasket 32' otherwise functions in a manner similar to gasket 32, shown for example in FIG. 2a. The hollow interior 34d is preferably either partially or fully filled with a liquid prior to the time that the expansion band 62 and clamping band 46 are installed and expanded against the compressible flange 34'. Also, to repair a leak, the region 34d may also be filled with a syringe, using a hydrophillic urethane liquid which expands into an elastomeric material to prevent leakage.

In certain applications, it is desirable to sealingly mount pipe of rather large outer diameter within a manhole opening. Although the most prevalent size manhole base is designed to accommodate 8 inch pipe, i.e. pipe having an 8 inch inner diameter, manhole bases of relatively large size can be designed to accommodate pipe having an outer diameter of 2 feet or more. THe large diameter of the sidewall opening required to accommodate pipe of such large outer diameter causes each sidewall opening to have a curvature conforming to the radius of curvature of the cylindrical sidewall of the manhole base, said radius of curvature being measured in a horizontal plane which is perpendicular to the vertically aligned sidewall 12 of manhole base 10.

As a result, it is necessary to provide a gasket assembly which, in addition to having a circular shaped outer flange 34, must be further capable of assuming a curved contour conforming to the radius of curvature of the sidewall in which the manhole opening is provided. Due to the resilient nature of the material employed to form the gasket 32, this requirement presents no problem. However, it is important to provide a clamping band 46 which is capable of assuming such a radius of curvature. This is accomplished in the present invention by providing clamping band 46, shown in FIGS. 3b and 3d with a plurality of pairs 56 of narrow, substantially V-shaped, slits 56a, 56b which are arranged along opposite edges 46a, 46b of endless band 46 and which extend inwardly therefrom toward one another. Considering one such pair of slits 56', let it be assumed that it is desired to impart a curvature to clamping band 46 considering the simplified view shown in FIG. 3d. Assuming portion 46f of band 46 to move relative to portion 46e, so that edge 46b occupies the dotted line position 46b', this movement is permissible due to the presence of slits 56a', 56b' whereby the angle formed by the V-shaped walls of slit 56b' increases while the angle formed by the walls of V-shaped slit 56a' decreases. Adjacent sections 46g, 46h, 46j and 46k are relatively movable in a similar fashion as shown in FIG. 3d. Obviously, the bending of clamping band sections 46c, 46d may occur in the reverse direction. The number of pairs 56 of narrow, V-shaped slits provided and the spacing therebetween is a function of the range of radius of curvature which may be required to be assumed by clamping band 46.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A gasket assembly for resiliently supporting a pipe within an opening and for sealing the annular region between the outer surface of the pipe and the surface of the opening, comprising:
    a gasket formed of a resilient, compressible material and having an outer flange adapted to be positioned against the opening in which the gasket is placed;
    said gasket having a central opening defined by an annular shaped peripheral portion of substantially circular cross-section;
    an intermediate, substantially V-shaped, folded section comprised of first and second webs joined to one another along a common annular fold and further integrally joined respectively to said outer flange and said inner annular portion;
    an annular clamping band formed of a plastic material substantially impervious to corrosive influences normally encountered in sewage systems and arranged to be positioned against the inner periphery of said flange;
    said clamping band having a discontinuity and including an insertable segment positioned within the gap formed by said discontinuity when the clamping band is expanded against said outer flange to lock said clamping band and maintain said outer flange under compression, the interactive forces between the compressed flange and the clamping band serving to retain the clamping band and insertable segment in a locked position against the inner periphery of said flange, the outer periphery of said flange being pressed into intimate engagement with the surface of said opening.

2. The gasket assembly of claim 1 wherein the clamping band is formed of polyvinylchloride.

3. The gasket assembly of claim 1 wherein the clamping band insertable segment is hingedly joined to one end of the major portion of the clamping band by means of a thin web of the clamping band material integral with said insertable segment and the major portion of said clamping band.

4. The gasket assembly of claim 3 wherein the connecting web is created by providing a recess in said clamping band a predetermined distance inward from one end thereof, adjacent said discontinuity, the depth of said cut being slightly less than the thickness of said clamping band, the plastic material of the clamping band remaining immediately adjacent said cut defining said web which hingedly connects the insertable segment to the remaining body of said clamping band.

5. The gasket assembly of claim 3 wherein said clamping band, said segment and said thin web form an integral clamping band molded in a single operation.

6. The apparatus of claim 5 wherein the radius of curvature of said segment is substantially the same as the radius of curvature of said clamping band.

7. The gasket assembly of claim 1 wherein said clamping band assumes a substantially curved contour and wherein said insertable segment has a radius of curvature substantially the same as the main portion of said clamping band.

8. The apparatus of claim 1 wherein said clamping band is expanded and said gasket flange is expanded and compressed against said opening by means of an expansion assembly.

9. The apparatus of claim 8 wherein said expansion assembly comprises an expandable member comprised of an annular band having a discontinuity therealong to form a gap between the free ends of said band defining said gap; and hydraulic jack means coupled to said annular band adjacent said free ends for expanding said annular band.

10. The apparatus of claim 9 further comprising a hydraulic power unit coupled to said hydraulic jack for expanding said expandable annular band.

11. The apparatus of claim 10 further comprising gauge means and conduit means for coupling said hydraulic power unit, said gauge and said hydraulic jack, whereby said gauge provides a pressure reading of the pressure imparted to said expandable band.

12. The apparatus of claim 8 wherein said clamping band is positioned against the inner periphery of said gasket flange and encircles said expandable band so that said expandable band exerts an expanding force substantially uniformly about the length of said clamping band, causing said clamping band to exert a substantially uniformly distributed force upon said gasket flange to place said gasket flange under compression between the surface of said opening and said clamping band.

13. The gasket assembly of claim 1 further comprising a tension strap encircling said intermediate section adjacent said annular inner periphery and being tightened to enhance the seal between said gasket and a pipe inserted through said central opening.

14. The gasket assembly of claim 13 wherein said intermediate section extends from one side of said flange and the associated side of said annular inner periphery so that said gasket serves as a barrier to shield both said clamping band and said tension strap from harmful influences which may be present on the exterior side of said opening.

15. The gasket assembly of claim 1 wherein said gasket is formed of neoprene.

16. The gasket assembly of claim 1 wherein said gasket is formed of polyisoprene.

17. The gasket assembly of claim 1 wherein said gasket is formed of EPDM.

18. The apparatus of claim 1 wherein said clamping band is provided with pairs of substantially V-shaped slits arranged at spaced intervals along said clamping band and extending from opposite side edges of said clamping band and inwardly toward the center of said clamping band to permit said clamping band to assume a curved contour in a direction orthogonal to the plane of the annular clamping band in order to conform to the radius of curvature of the opening which radius of curvature substantially conforms to the radius of curvature of the cylindrical sidewall in which the opening is formed.

19. The apparatus of claim 1 wherein said outer flange is provided with a hollow annular interior.

20. The apparatus of claim 1 wherein said hollow annular interior is filled with an elastomeric material which is injected in liquid form to enhance the watertight seal.

21. The apparatus of claim 1 wherein the outer periphery of said outer flange is provided with spaced projections arranged to engage the surface of said opening.

22. A method for installing a gasket assembly comprised of a gasket and a cooperating clamping band, said gasket being formed of a resilient, compressible material and having an outer flange adapted to be positioned against the opening in which the gasket is placed;

said gasket having a central opening defined by an annular shaped peripheral portion of substantially circular cross-section;

an intermediate, substantially V-shaped, folded section comprised of first and second webs joined to one another along a common annular fold and further integrally joined respectively to said outer flange and said inner annular portion;

said clamping band being an annular shaped plastic member having a discontinuity to enable expansion thereof; and an expansion assembly comprised of an expandable metallic band formed of a suitable springy, metallic material, said band having a discontinuity and a hydraulic jack coupled to said band adjacent the ends of said band defining said discontinuity, said method comprising the steps of:

placing said gasket within said opening so that the outer periphery of said flange confronts the surface of said opening;

placing said clamping band about said expansion band and positioning said clamping band and said expansion band within the inner periphery of said gasket flange;

introducing fluid pressure into said hydraulic jack to cause the expandable band to increase its circumference, thereby expanding said clamping band and compressing said gasket flange between the surface of said opening and said clamping band;

expanding said expandable band until a predetermined pressure condition is reached;

placing a segment within the gap between the free ends of said clamping band; and releasing the fluid pressure from said hydraulic jack causing the compressed gasket flange and clamping band to exert counteracting forces against one another which further serve to retain the clamping band in the locked position and which serve to retain the gasket flange in the compressed state between the surface of said opening and said clamping band, to provide a watertight seal therebetween.

23. The method of claim 22 further comprising the steps of inserting one end of a pipe through the central opening in said gasket whereby said gasket serves to resiliently support said pipe within said opening and providing a good watertight seal therebetween, said folded intermediate section enabling the longitudinal axis of said pipe to be displaced from concentricity with the central axis of said opening by a significant amount without impairing the effectiveness of said seal.

24. The method of claim 23 further comprising the steps of placing a tension strap about a portion of said gasket intermediate section adjacent said inner periphery; and tightening said tension strap to compress the portion of said intermediate section encircled by said tension strap and thereby enhancing the watertight seal between the said gasket and said pipe.

25. A method for installing a gasket assembly comprised of a gasket and a cooperating clamping band, said gasket being formed of a resilient, compressible material and having an outer flange adapted to be positioned against the opening in which the gasket is placed;

said gasket having a central opening defined by an annular shaped peripheral portion of substantially circular cross-section;

an intermediate, substantially V-shaped, folded section comprised of first and second webs joined to one another along a common annular fold and further integrally joined respectively to said outer flange and said inner annular portion;

said clamping band being an annular shaped plastic member having a discontinuity to enable expansion thereof, said method comprising the steps of:

placing said gasket within said opening so that the outer periphery of said flange confronts the surface of said opening;

positioning said clamping band within the inner periphery of said gasket flange;

exerting an outward radial force substantially uniformly over the interior surface of said clamping band to expand said clamping band and compress said gasket flange between the surface of said opening and said clamping band;

expanding the clamping band in this manner until the clamping band expands to a predetermined circumference;

placing a segment within the gap between the free ends of said clamping band to substantially completely fill said gap; and releasing the force applied to said clamping band causing the compressed gasket flange and clamping band to exert counteracting forces against one another which serve to retain the clamping band and insert in the locked position and which further serve to retain the gasket flange in the compressed state between the surface of said opening and said clamping band, to provide a watertight seal therebetween.

* * * * *

UNITED STATES PATENT AND TRADEMARK OFFICE
CERTIFICATE OF CORRECTION

PATENT NO. :  4,387,900
DATED      :  June 14, 1983
INVENTOR(S):  Ditcher, et al.

It is certified that error appears in the above—identified patent and that said Letters Patent is hereby corrected as shown below:

Column 2, line 31, change "comprises an" to --comprising--.

Column 9, line 21, change "THe" to --The--.

Signed and Sealed this

Twentieth Day of August 1985

[SEAL]

Attest:

DONALD J. QUIGG

Attesting Officer

Acting Commissioner of Patents and Trademarks